Patented Mar. 7, 1950

2,500,033

UNITED STATES PATENT OFFICE 2,500,033

1,5 PENTANEDIOL BIS-CYCLOHEXYL ACETATE

Stanford J. Hetzel, Cheltenham, Pa., assignor to Sun Oil Company, Philadelphia, Pa., a corporation of New Jersey No Drawing. Application August 25, 1948, Serial No. 46,182

1 Claim. (Cl. 260—468)

The present invention relates to a novel compound derived from 1,5-pentanediol

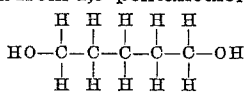

specifically to 1,5-pentanediol bis-cyclohexylacetate

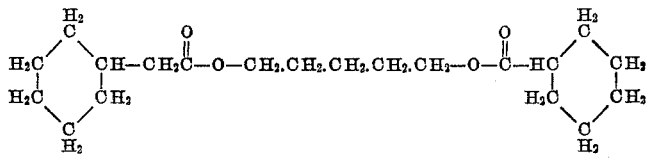

and to its method of preparation.

According to the invention the foregoing ester of 1,5-pentanediol was prepared by refluxing in the presence of a trace of para-toluene sulfonic acid approximately stoichiometric quantities of 1,5-pentanediol and cyclohexylacetic acid in presence of a solvent, for example commercially available xylenes.

To suppress the formation of partial ester an excess of the cyclohexylacetic acid should be employed.

Other acid catalysts can be employed. For example sulfuric acid, hydrochloric acid and other acids commonly used in esterification processes can be employed in minor quantities.

Other solvents for example toluene or even higher boiling aromatics can be employed. Solvents inert under the conditions of the reaction also can be used.

The following is an example of the preparation of the ester of this invention:

Example 120 grams cyclohexylacetic acid (0.78 mole) was heated under refluxing conditions with 39 grams (0.37 mole) of 1,5-pentanediol and 250 cc. xylene for 8 hours. Two grams of para-toluene sulfonic acid was used as a catalyst. Water from the esterification was removed continuously in a Dean-Stark tube. The reaction product was washed with 20% aqueous solution of sodium carbonate and dried over anhydrous calcium chloride. Xylene was removed and the remainder of the reaction mass was distilled taking three cuts as follows:

|  | Grams |
|---|---|
| Cut #1—boiling below 210° C./4 mm. Hg. (unreacted 1,5-pentanediol and half-ester) | 9.5 |
| Cut #2—210° C.-216° C./4 mm. Hg. (product of the invention) | 109.6 |
| Cut #3—above 216° C./4 mm. Hg. (polymeric material—residue) | 9.5 |

The product of this invention is a colorless to amber oil-like material having a boiling point at 5 mm. Hg. of about 210° C.-216° C., a refractive index $$N_D^{20°C.} 1.4726$$

and a density of $$D_4^{20°C.} 1.0073$$

The ester of this invention has been found useful as a plasticizer for polyvinyl resins such as polyvinyl chloride and polyvinyl chloride-polyvinyl acetate mixtures.

In copending application for Patent Serial No. 46,187, filed by the instant inventor August 25, 1948, there is described and claimed a polyvinyl resin in plasticized composition with the ester of this invention.

I claim:

1,5-pentanediol bis-cyclohexylacetate.

STANFORD J. HETZEL.

REFERENCES CITED

The following references are of record in the file of this patent:

UNITED STATES PATENTS

| Number | Name | Date |
|---|---|---|
| 2,010,692 | Grether et al. | Aug. 6, 1935 |
| 2,016,392 | Schneider | Oct. 8, 1935 |
| 2,017,070 | Lazier | Oct. 15, 1935 |
| 2,208,960 | Coleman et al. | July 23, 1940 |
| 2,339,387 | Endres | Jan. 18, 1944 |

OTHER REFERENCES

Ser. No. 367,292, Berg et al. (A. P. C.), published April 20, 1943.